US012128577B1

(12) United States Patent
Taylor

(10) Patent No.: US 12,128,577 B1
(45) Date of Patent: Oct. 29, 2024

(54) PATIO SCREEN SHAVER

(71) Applicant: The Screen Shaver, LLC, Palm Coast, FL (US)

(72) Inventor: James Richard Taylor, Palm Coast, FL (US)

(73) Assignee: The Screen Shaver, LLC, Palm Coast, FL (US)

(*) Notice: Subject to any disclaimer, the term of this patent is extended or adjusted under 35 U.S.C. 154(b) by 0 days.

(21) Appl. No.: 18/601,242

(22) Filed: Mar. 11, 2024

(51) Int. Cl.
*B26B 27/00* (2006.01)
*B25G 1/06* (2006.01)

(52) U.S. Cl.
CPC ................ *B26B 27/00* (2013.01); *B25G 1/06* (2013.01)

(58) Field of Classification Search
CPC .................. B26B 27/00–007; B25G 1/06–066
See application file for complete search history.

(56) References Cited

U.S. PATENT DOCUMENTS 3,928,886 A * 12/1975 Marino .................... B25G 1/06 403/4
4,033,036 A * 7/1977 Morris .................... B26B 27/00 30/144
4,050,728 A * 9/1977 Davidson ............... A01B 1/026 294/58
4,208,793 A * 6/1980 Sinnott .................. A62C 33/00 7/161
6,249,974 B1 * 6/2001 Hartzell .................. B26B 27/00 294/104
12,084,324 B1 * 9/2024 Huang ..................... B25G 1/06
2004/0083861 A1 * 5/2004 Hu ......................... B25G 1/063 81/177.8
2015/0296705 A1 * 10/2015 Urrutia .................... A01D 7/10 56/400.12
2016/0030619 A1 * 2/2016 Clark ........................ A61L 2/00 29/418
2019/0329386 A1 * 10/2019 Hersh ..................... B25G 1/063
2020/0305332 A1 * 10/2020 Speas ..................... A01B 43/00

* cited by examiner

*Primary Examiner* — Sean M Michalski
(74) *Attorney, Agent, or Firm* — H. Brock Kolls

(57) ABSTRACT

The present invention relates to a patio screen shaver for cutting pine needles that are impaled in a patio screen. The patio screen shaver includes a blade, a handle adapter, a handle, and a blade mount. The blade is secured in the blade mount and positioned to slide along the surface of the patio screen during use. The handle adapter interconnects with the blade mount adapter and has a geared ring. A handle interconnects with the handle adapter, and a button with a geared end engages the geared ring securing the handle and the handle adapter together in a movable manner. A user can press the button, allowing the handle adapter to rotate, changing the angle of the blade with respect to the handle. Releasing the button interlocks the geared end and the geared ring setting the angle of the blade for use by the user.

20 Claims, 18 Drawing Sheets

PATIO SCREEN SHAVER

TECHNICAL FIELD OF THE INVENTION

This invention relates to a patio screen shaver for cutting pine needles that are impaled in a patio screen. A user can press a button, allowing the handle adapter to rotate, changing the angle of the blade with respect to the handle. Releasing the button locks the angle of the blade in position for use by the user. During use, the user slides the patio screen shaver along the surface of the patio screen to cut impaled pine needles free from the patio screen surface.

BACKGROUND OF THE INVENTION

Before our invention screened-in patio rooms while beautiful in protecting the occupants from insects and other creatures were notorious for being impaled by falling pine needles which can be very difficult to reach and remove. In this regard, while not damaging the patio screens the falling pine needles do easily penetrate the screen surface through the screen holes part way becoming impaled. Too big to pull through the interior surface side of the screen, a shortcoming is that the impaled pine needles most often need to be removed from the exterior surface side of the patio screen. This can be a formidable task as screen rooms aren't designed to have the weight of a person climbing on top much less crawling around trying to remove pine needles from the surface.

Another shortcoming is that since the removal of the impaled pine needles can be extremely difficult due to height, location, reach, and other factors, they are often left to gather in numbers impaled through the patio screen surfaces for long periods of time. In numbers, this can cause water to gather or create a situation where the wet pine needles create mold, gather debris, and generally muck up the screen surface.

The present invention addresses these and other shortcomings by providing a patio screen shaver for cutting impaled pine needles free from patio screen surfaces and other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a patio screen shaver for cutting pine needles that are impaled in a patio screen. The patio screen shaver comprises a blade. The blade comprises a cutting edge. The blade has one or more blade holes therethrough.

The patio screen shaver further comprises a blade mount. The blade mount comprises a blade mount adapter, a top lip, and a bottom lip parallel to the top lip forming a blade gap therebetween. The blade mount has one or more mounting holes. The blade slides into the blade gap. The blade hole and the mounting hole align and one or more fasteners pass through the blade holes and the mounting holes securing the blade within the blade mount gap between the top lip and the bottom lip. The top lip extends along the top surface of the blade and the bottom lip extends along the bottom surface of the blade. The top lip extends beyond the bottom lip creating a pressure fulcrum on the top side of the blade, forcing the cutting edge downward along the surface of the patio screen during use.

The patio screen shaver further comprises a handle adapter. The handle adapter has an exterior surface and an interior surface. The handle adapter comprises an adapter receiver that interconnects with the blade mount adapter, and a geared ring that is integrally formed on the interior surface.

The patio screen shaver further comprises a handle that interconnects with the handle adapter in a movable manner. The handle has a handle exterior surface and a handle interior surface. The handle comprises a spring recess along the handle exterior surface for receiving a spring and one or more button cutouts proximate to the spring recess. And, a button. The button comprises a closed end and a geared end. The button has one or more of a side-notched cutout between the closed end and the geared end, allowing the button to be fitted into the button cutout capturing the spring within the spring recess and engaging the geared end with the geared ring securing the handle and the handle adapter together in a movable manner.

Additional shortcomings of the prior art are overcome and additional advantages are provided through the provision of a method of using the patio screen shaver. The method comprises the step of adjusting an angle of the blade with respect to the handle by way of a user pressing the button which compresses the spring and disengages the geared end from the geared ring allowing the handle adapter to rotate, changing the angle of the blade with respect to the handle.

The method continues by locking the angle of the blade in position with respect to the handle by way of the user releasing the button which decompresses the spring and engages the geared end with the geared ring securing the handle adapter in place, setting the angle of the blade, and abating rotational motion of the handle adapter with respect to the handle.

The method continues by sliding the patio screen shaver along the surface of the patio screen, cutting the pine needles impaled in the patio screen.

Additional shortcomings of the prior art are overcome and additional advantages are provided through the provision of a patio screen shaver for cutting pine needles that are impaled in a patio screen. The patio screen shaver comprises a blade. The blade comprises a cutting edge. The blade has one or more blade holes therethrough.

The patio screen shaver further comprises a blade mount. The blade mount comprises a blade mount adapter, a top lip, and a bottom lip parallel to the top lip forming a blade gap therebetween. The blade mount has one or more mounting holes therethrough. The blade slides into the blade gap. The blade holes and the mounting holes align and one or more fasteners pass through the blade holes and the mounting holes securing the blade within the blade mount gap between the top lip and the bottom lip. The top lip extends along the top surface of the blade and the bottom lip extends along the bottom surface of the blade. The top lip extends beyond the bottom lip creating a pressure fulcrum on the top side of the blade, forcing the cutting edge downward along the surface of the patio screen during use.

The patio screen shaver further comprises a handle adapter. The handle adapter has an exterior surface and an interior surface. The handle adapter comprises an adapter receiver that interconnects with the blade mount adapter, and a geared ring that is integrally formed on the interior surface.

The patio screen shaver further comprises a handle that interconnects with the handle adapter in a movable manner. The handle has a handle exterior surface and a handle interior surface. The handle comprises a spring recess along the handle exterior surface for receiving a spring and one or more button cutouts proximate to the spring recess.

The patio screen shaver further comprises a button. The button comprises a closed end and a geared end. The button has one or more side-notched cutouts between the closed end and the geared end, allowing the button to be fitted into the button cutout capturing the spring within the spring recess and engaging the geared end with the geared ring securing the handle and the handle adapter together in a movable manner.

In operation, the patio screen shaver transitions between adjusting an angle of the blade with respect to the handle by way of a user pressing the button which compresses the spring and disengages the geared end from the geared ring allowing the handle adapter to rotate and change the angle of the blade with respect to the handle. And, setting the angle of the blade by way of the user releasing the button which decompresses the spring and engages the geared end with the geared ring securing the handle adapter in place, and abating rotational motion of the handle adapter with respect to the handle when the patio screen shaver is used by the user to cut the pine needles impaled in the patio screen.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
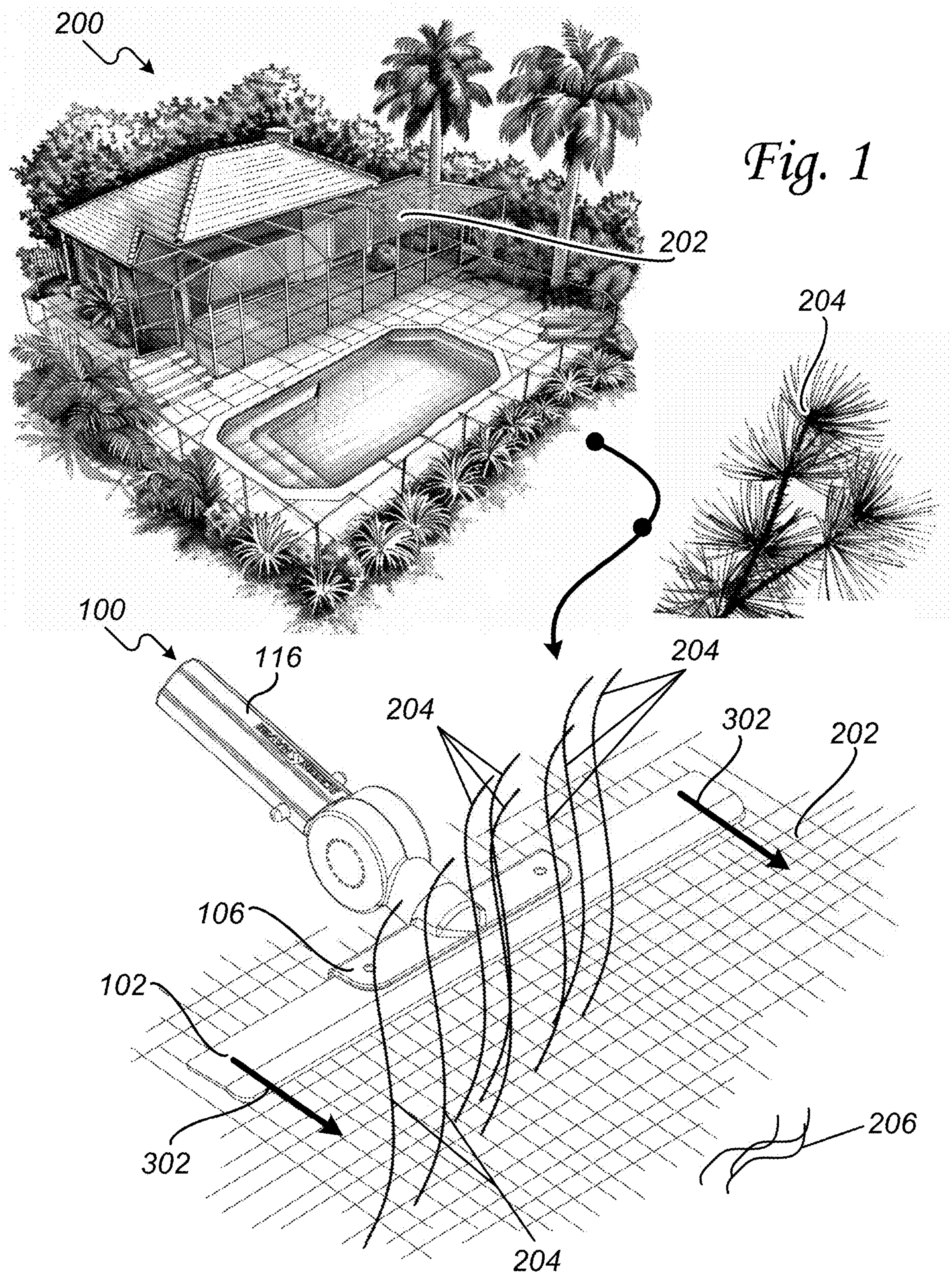
FIGS. 1-2 illustrate examples of a patio screen shaver.

Turning now to the drawings in greater detail, it will be seen that in FIG. 1 there is illustrated one example of a patio screen shaver 100. In an exemplary embodiment, the outdoor 200 patio screen room 202 is quite popular. A shortcoming however is that when the patio screen room 202 is proximate to pine trees the pine needles 204 that fall from the pine trees often get impaled in the patio screen 202. Stuck partially through the small openings in patio screen 202 the pine needles can be difficult to remove from the bottom side of the patio screen, the area in which a consumer might be able to reach. Rather, the pine needles 204 need to be removed from the exterior surface of the patio screen 204 which in the case of a screen room can be very difficult to reach and often does not afford the structural strength for a handyman to walk on the roof of the screen room to remove the pine needles 204.

An advantage, in the present invention, is that the patio screen shaver 100 can be configured to slide along 302 the patio screen 202 and sever, by way of the blade 102, the impaled pine needles 204 allowing the cut pine needles 206 to fall from the patio screen 206 or slide along the exterior surface of the patio screen 202 falling to the ground. The patio screen shaver 100 can be used on the interior or exterior surface of the patio screen 202.

In an exemplary embodiment, the patio screen shaver can be fabricated from plastic, metal, rubber, other suitable materials, and/or a combination thereof.

Figure 2:
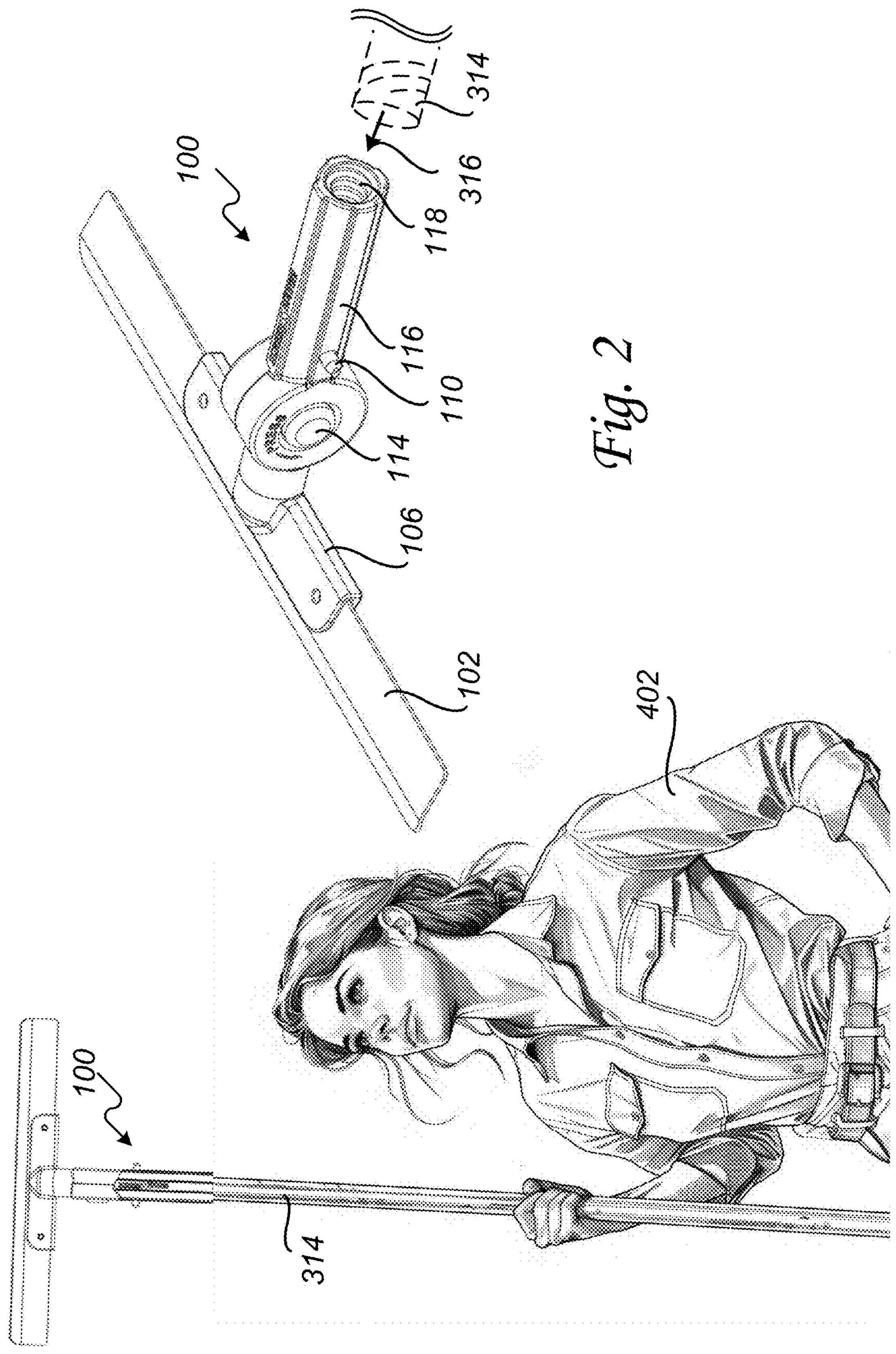

Referring to FIG. 2, there is illustrated one example of a patio screen shaver. In an exemplary embodiment, a pole 314 can be threaded into the handle 116 threaded pole hole 118 end. In operation, a handyman, handywoman, consumer, or other user collectively referred to as user 402 can extend the reach of the patio screen shaver 100, making it easy to cut impaled pine needles 304 across the long surfaces of the patio screen 202, avoiding having to climb on the patio screen room 200 roof, and minimizing the need for the user to use a ladder.

In an exemplary embodiment, handle 116 can comprise a threaded pole hole 118 for receiving a pole having a threaded end 314. In this regard, pole 314 extends the reach of the patio screen shaver 100 making it easier and faster for user 402 to shave large, high, and hard-to-reach areas quickly and safely.

Figure 3:
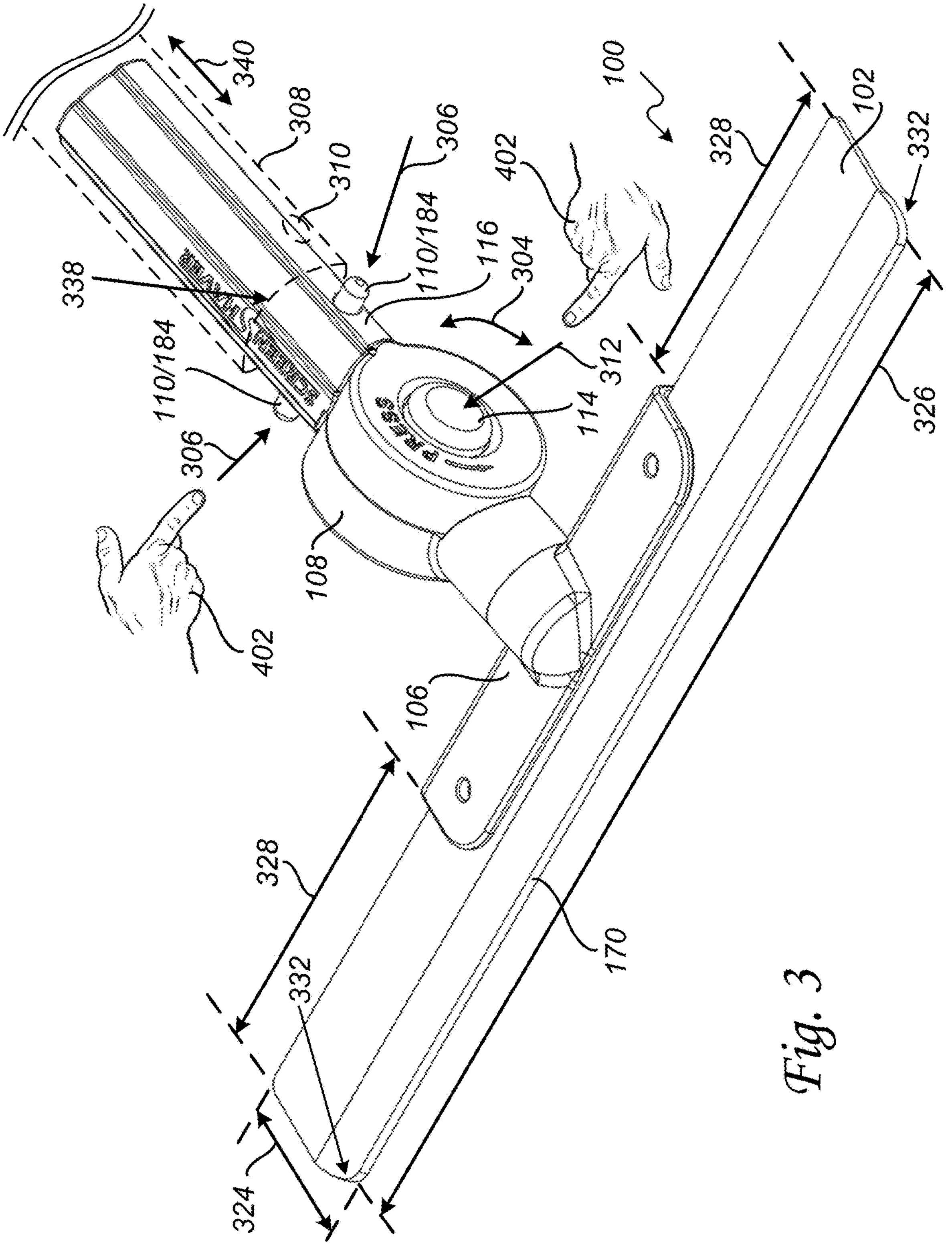
FIGS. 3-6 illustrates perspective views of a patio screen shaver.

Referring to FIG. 3, there is illustrated a top-front-right perspective view of a patio screen shaver 100. In an exemplary embodiment, the patio screen shaver 100 cuts pine needles 204 that are impaled in a patio screen 202. The patio screen shaver comprises a blade 102. Blade 102 comprises a cutting edge 170. Blade 102 has one or more blade holes 174 therethrough.

Figure 8:
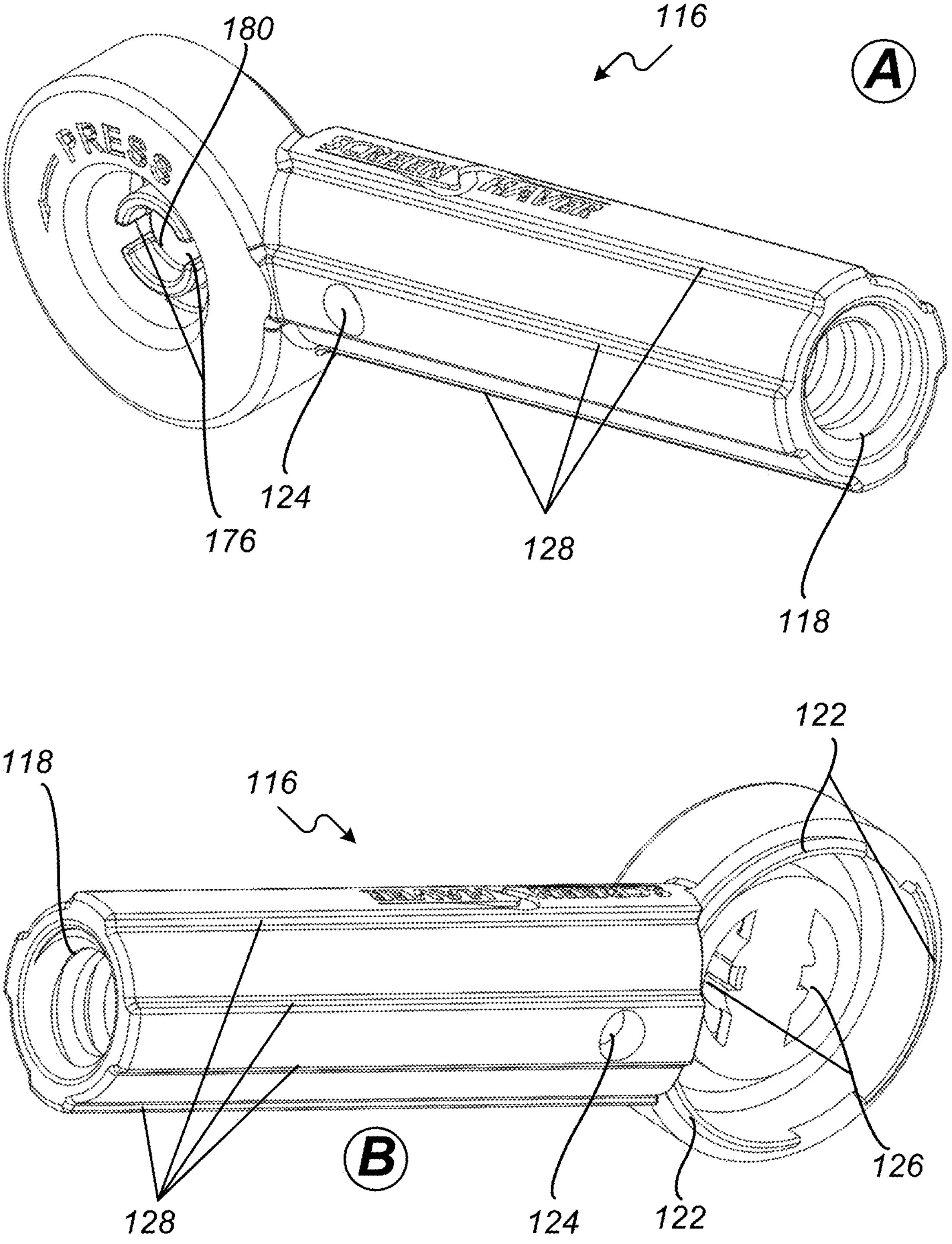
FIG. 8 illustrates interior and exterior perspective views of a handle.

In an exemplary embodiment, and with reference to at least FIGS. 3 and 8, a wishbone connector 110 has at least one of a peg 184 integrally formed on at least one end of the wishbone connector 110. Handle 116 has at least one peg hole 124. The wishbone connector 110 fits inside handle 116 and the peg 184 protrudes through the peg hole 124 and is accessible to the user 402. Pole 308 has a hollow end 338 and at least one pole peg hole 310. Handle 116 slides 340 into the hollow end 338 and the peg 184 protrudes through the pole peg hole 124 securing the patio screen shaver 100 to the pole 308. In operation, the user 402 can press with a finger to depress peg 184 allowing the pole 308 to slide over peg 184 and into position, The wishbone connector 110 under tension forces the pegs back through the pole peg holes 310 when they are positioned over the pegs 184 interlocking the pole 310 and the patio screen shaver 100 together for use by the user 402.

Figure 11:
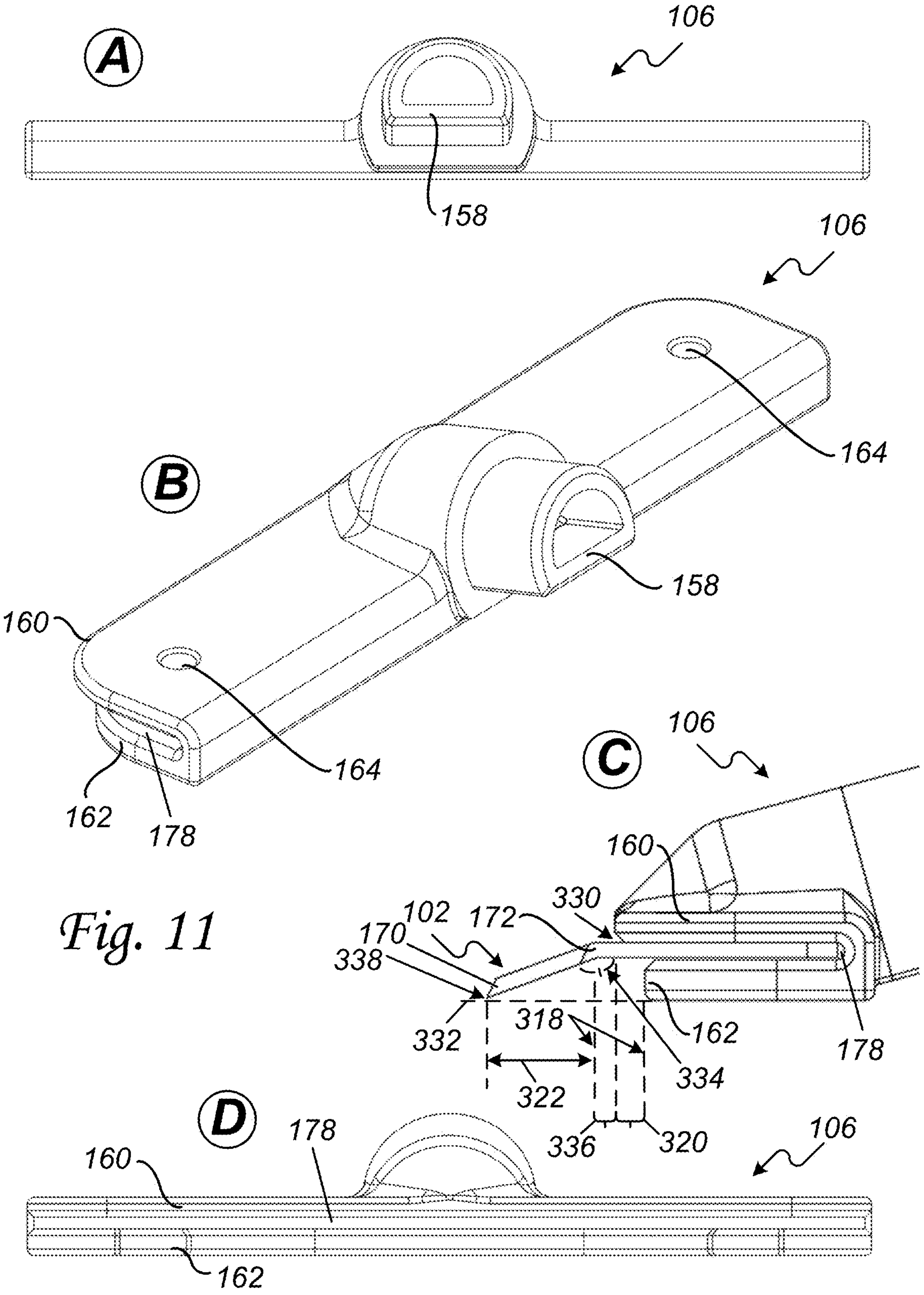
FIG. 11 illustrates back, front, side, and perspective views of a blade mount.

Better illustrated in at least FIGS. 3 and 11, blade mount 106 comprises a blade mount adapter 158, a top lip 160, and a bottom lip 162 parallel to the top lip 160 forming a blade gap 178 therebetween. Blade mount 106 has one or more mounting holes 164 therethrough. In operation, blade 102 slides into the blade gap 178, blade holes 174 and mounting holes 164 align, and one or more fasteners 130 pass through the blade holes 174 and the mounting holes 164 securing blade 102 within the blade mount gap 178 between the top lip 160 and the bottom lip 162. The top lip 160 extends along the top surface of blade 102 and the bottom lip 162 extends along the bottom surface of the blade 102. The top lip 160 extends 320 beyond the bottom lip 162 creating a pressure fulcrum 330 on the top side of blade 102, forcing the cutting edge 170 downward along the surface of the patio screen 202 during use. Additionally, the top lip 160 is setback 336 behind the alignment bend 172.

Figure 9:
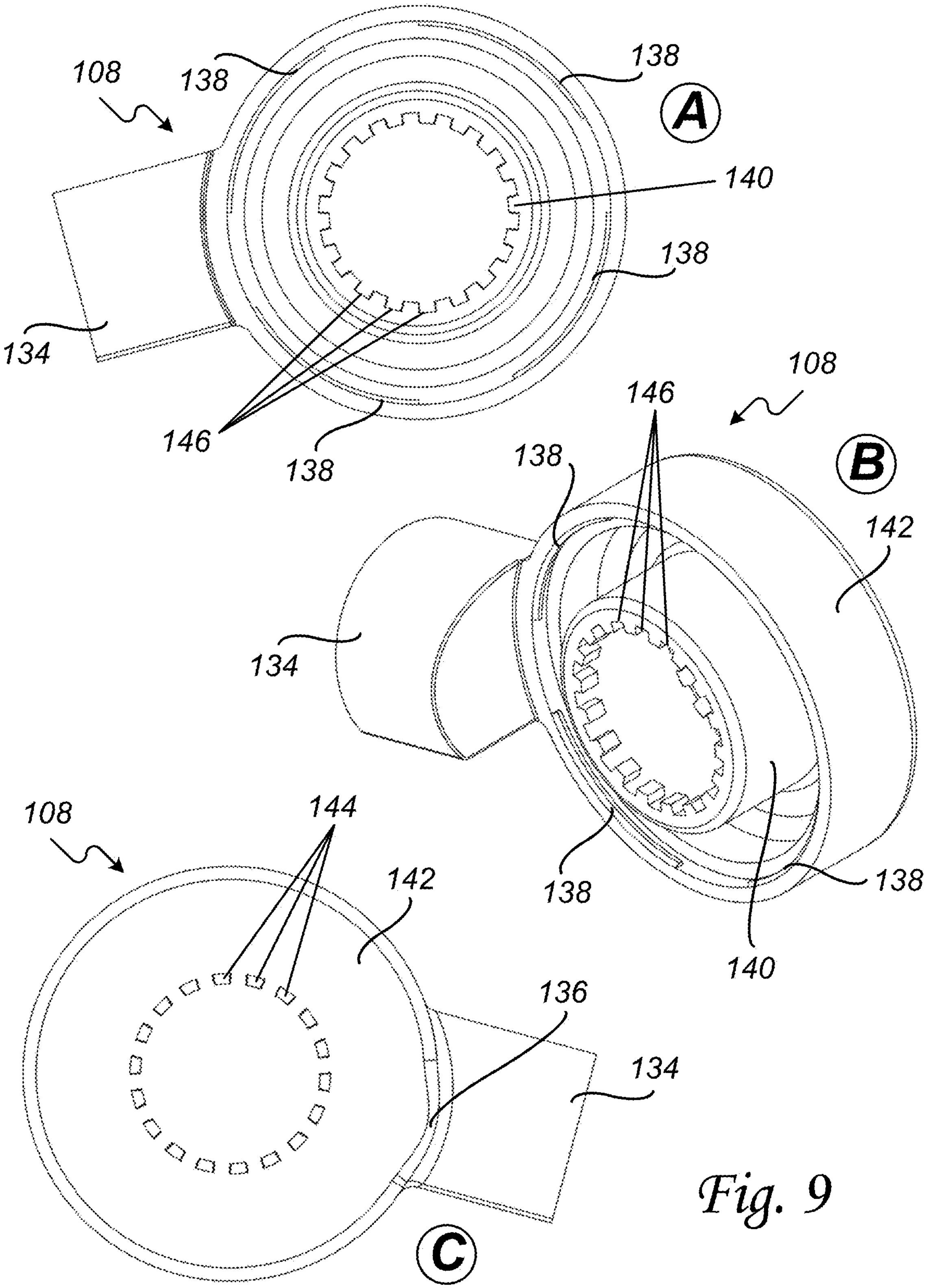
FIG. 9 illustrates interior, exterior, and perspective views of a handle adapter.

Better illustrated in at least FIGS. 3 and 9, handle adapter 108 has an exterior surface and an interior surface. The handle adapter 108 comprises an adapter receiver 134 that interconnects with the blade mount adapter 158, and a geared ring 140 integrally formed on the interior surface. The gear teeth 146 are formed along the interior circumference proximate to the outer edge of the geared ring 140.

Better illustrated in at least FIGS. 3 and 8, a handle 116 interconnects with the handle adapter 108 in a movable 304 manner. Handle 116 has a handle exterior surface and a handle interior surface. Handle 116 comprises a spring recess 180 along the handle exterior surface for receiving a spring 112 and one or more button cutouts 126 proximate to the spring recess 180.

Figure 10:
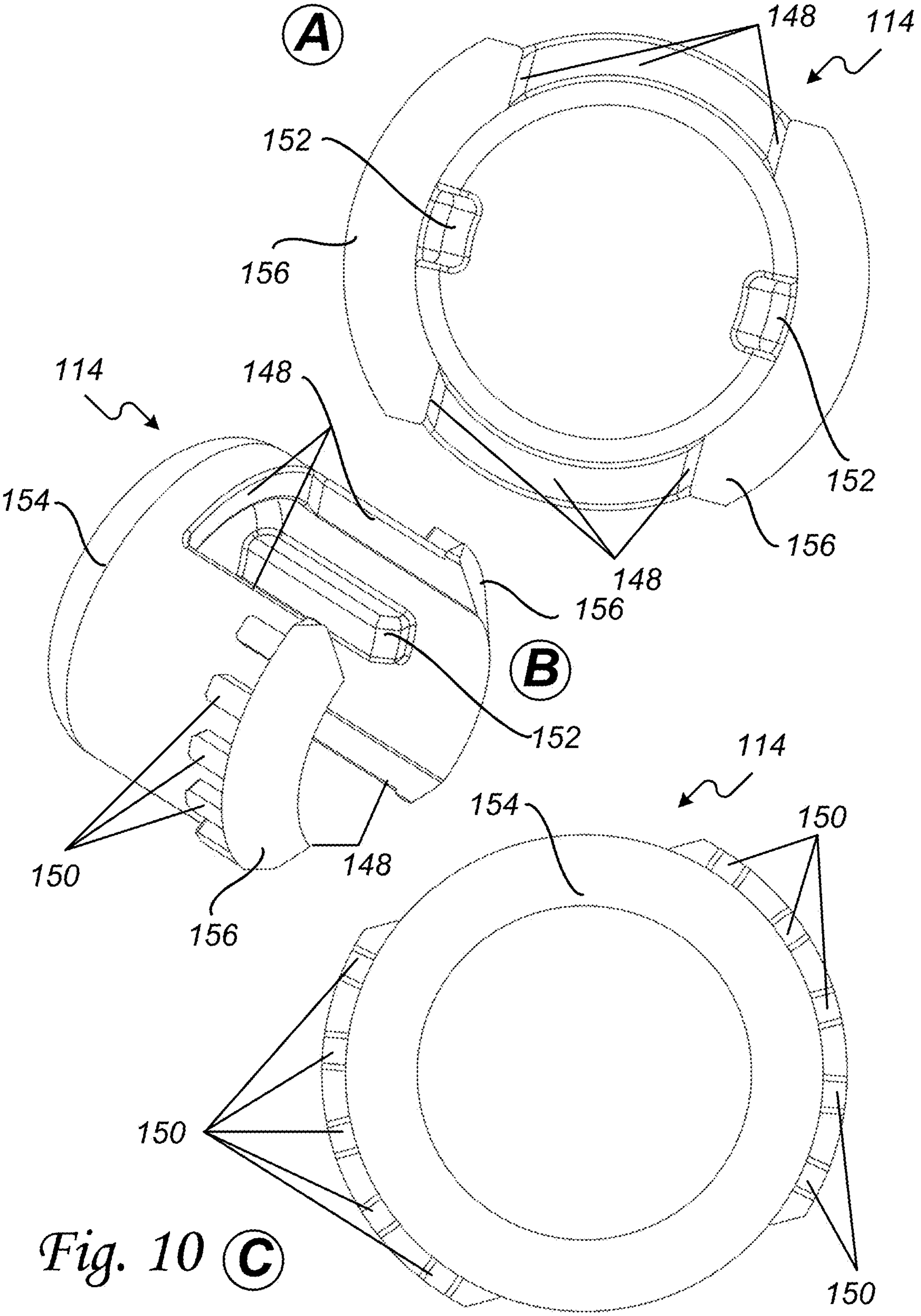
FIG. 10 illustrates interior, exterior, and perspective views of a button.

Better illustrated in at least FIGS. 3 and 10, button 114 comprises a closed end 154 and a geared end 156. Button 114 has one or more side-notched cutouts 148 between the closed end 154 and the geared end 156, allowing button 114 to be fitted into the button cutout 126 capturing spring 112 within the spring recess 180 and engaging the geared end 156 with the geared ring 140 securing handle 116 and the handle adapter 108 together in a movable 304 manner. The geared end gear teeth 150 of the geared end 156 are integrally formed along the exterior surface and proximate to the geared end 156.

With reference to at least FIG. 3, in operation, the patio screen shaver 100 transitions between adjusting the angle 304 of the blade 102 with respect to handle 116 by way of a user 402 pressing 312 button 114 which compresses spring 112 and disengages the geared end 156 from the geared ring 140, allowing the handle adapter 108 to rotate 304 and changing the angle of the blade 102 with respect to handle 116. And, setting the angle of the blade 102 by way of the user 402 releasing button 114 which decompresses spring 112 and engages the geared end 156 with the geared ring 140 (interlocking the geared end gear teeth 150 and the gear teeth 146), securing the handle adapter 108 in place with respect to handle 116, and abating rotational motion of the handle adapter 108 with respect to the handle 116 when the patio screen shaver 100 is used by the user 402 to cut the pine needles 204 impaled in the patio screen 202.

In an exemplary embodiment, the blade mount 106 has a left side and a right side. Blade 102 extends beyond the left side 328 and the right side 328 of the blade mount 106.

In an exemplary embodiment, the corners of the cutting edge 170 are smooth and rounded 332. In operation, the smooth and rounded edges 332 of the blade 332 are abated from catching and inadvertently cutting the patio screen 202. Additionally, and with reference to at least FIGS. 3 and 11, an alignment bend 172 angle 334 traverses the length 326 of blade 102. The alignment bend 172 can be positioned between the cutting edge 170 and the pressure fulcrum 330. In operation, angle 334 of the alignment bend 172 positions the tip of the cutting edge 170 proximate to the bottom 332 of the bottom lip 146 so that in use, as the bottom lip 162 travels along the patio screen 202 surface, the cutting edge 170 is a predetermined safe cut distance 338 above the patio screen 202 surface, so that damage to the patio screen 202 by the cutting edge 170 is abated.

Figure 4:
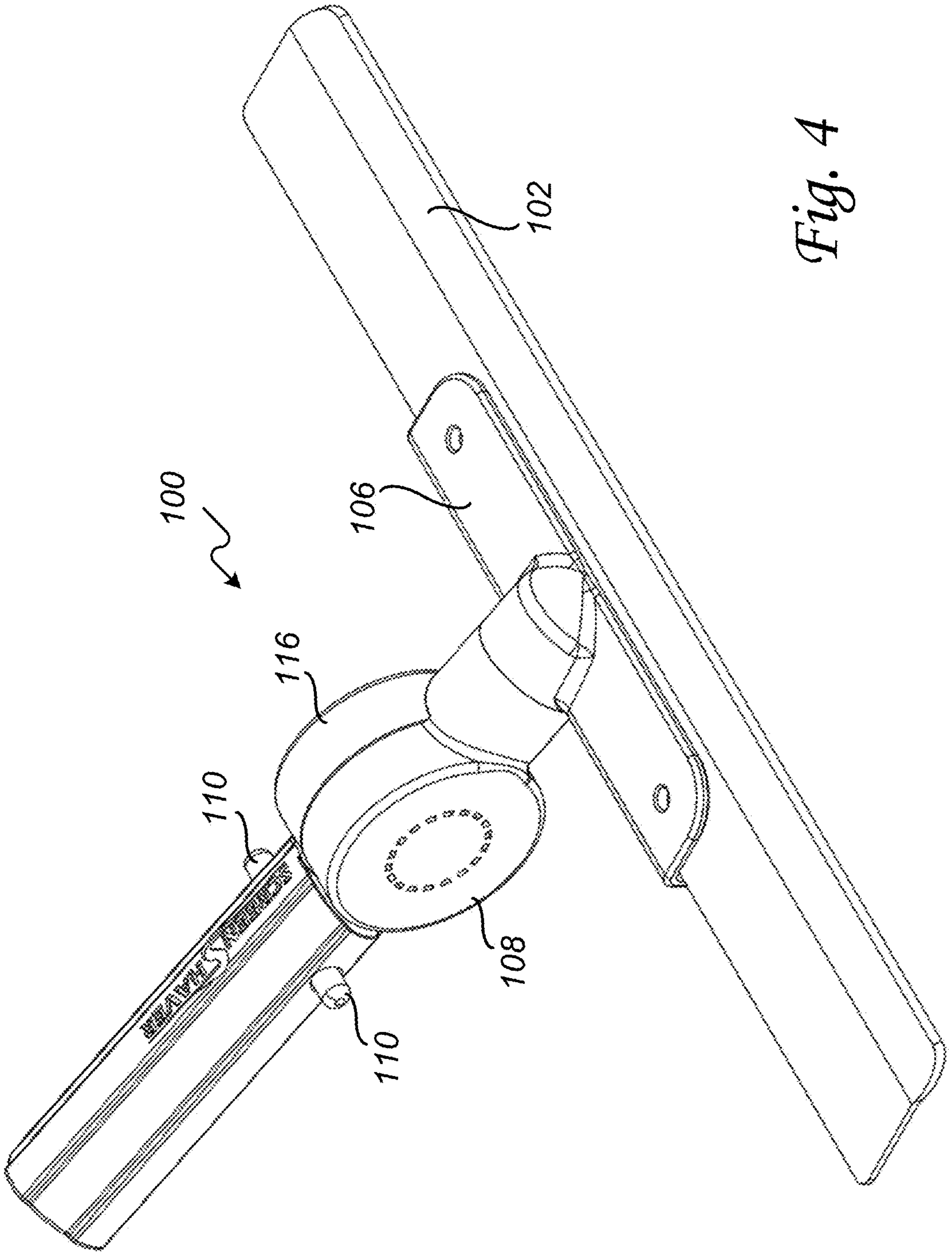

Referring to FIG. 4, there is illustrated a top-front-left perspective view of a patio screen shaver 100.

Figure 5:
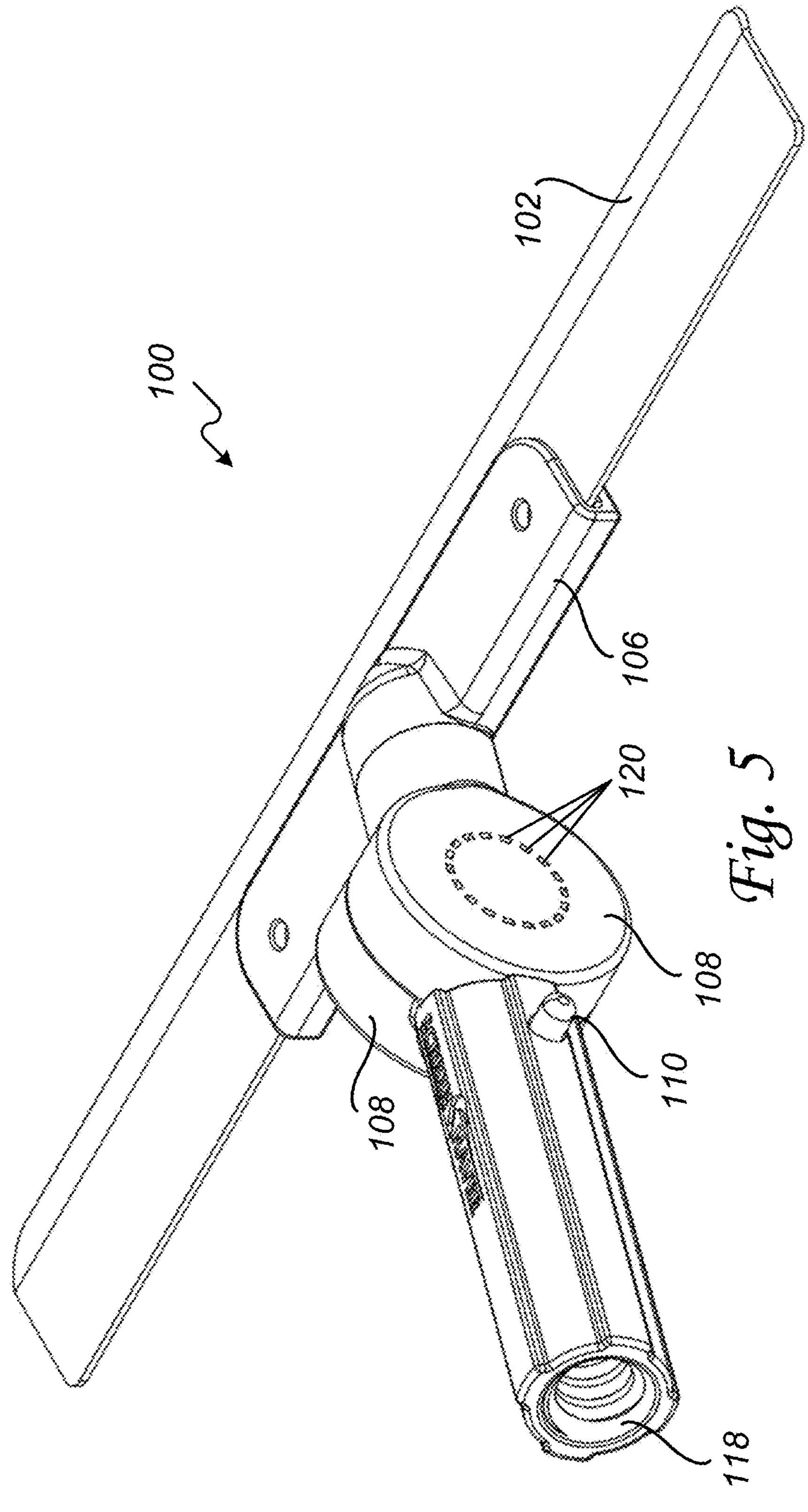

Referring to FIG. 5, there is illustrated a top-rear-left perspective view of a patio screen shaver 100. In an exemplary embodiment, the handle adapter 108 has more than one position indicator hole 120. In operation, by way of the position indicator holes 120 indication of the angle of the blade 102 with respect to the handle 116 is viewable to and settable by the user 402. In this regard, as one example and not a limitation, a colored segment, indicia, or other markings printed on the interior surface of handle 116 which is stationary with respect to handle 116 is viewable through the position indicator holes 120. Additionally, indicia or other markings can be present on the exterior surface of the handle adapter 108 proximate to the position indicator holes 120 to identify at least some of the position indicator holes 120 that user 402 can rely on for selecting a setting. As the handle adapter 108 is repositioned with respect to handle 116 the position indicator holes 120 shift so that the indicia is viewable through a different one of the position indicator holes 120 providing an indication to user 402 of the angle of blade 102 with respect to the handle 116.

Figure 6:
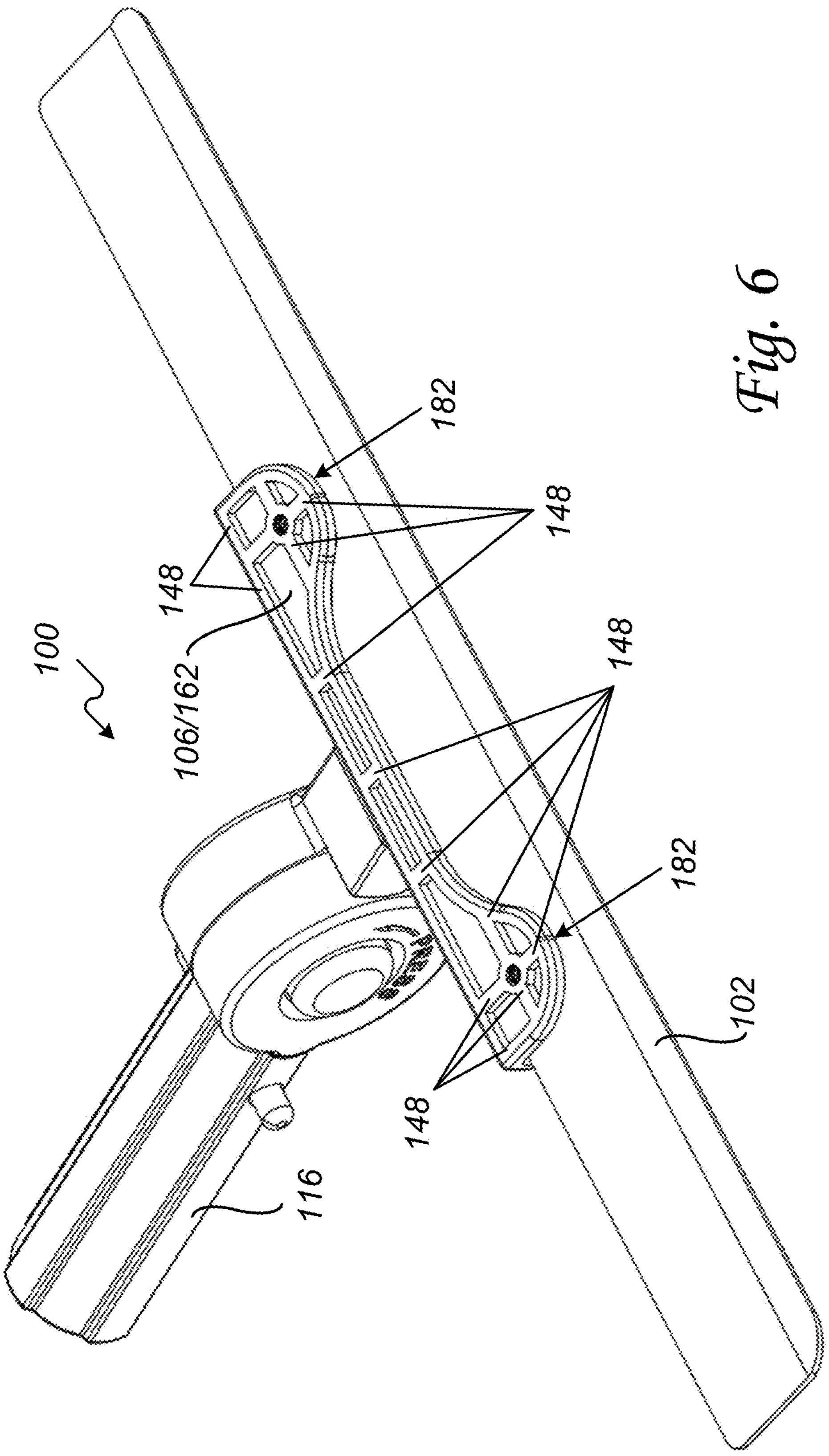

Referring to FIG. 6, there is illustrated a bottom-front-right perspective view of a patio screen shaver 100. In an exemplary embodiment, a gliding rib 148 is integrally formed on the bottom side of the bottom lip 162 of the blade mount 106. The gliding rib 148 traverses the perimeter of the bottom lip 162. The gliding rib 148 is smooth and rounded along the front corners 182 and edges, to abate damage when sliding along the patio screen 202 during use of the patio screen shaver 100 by the user 402.

Figure 7:
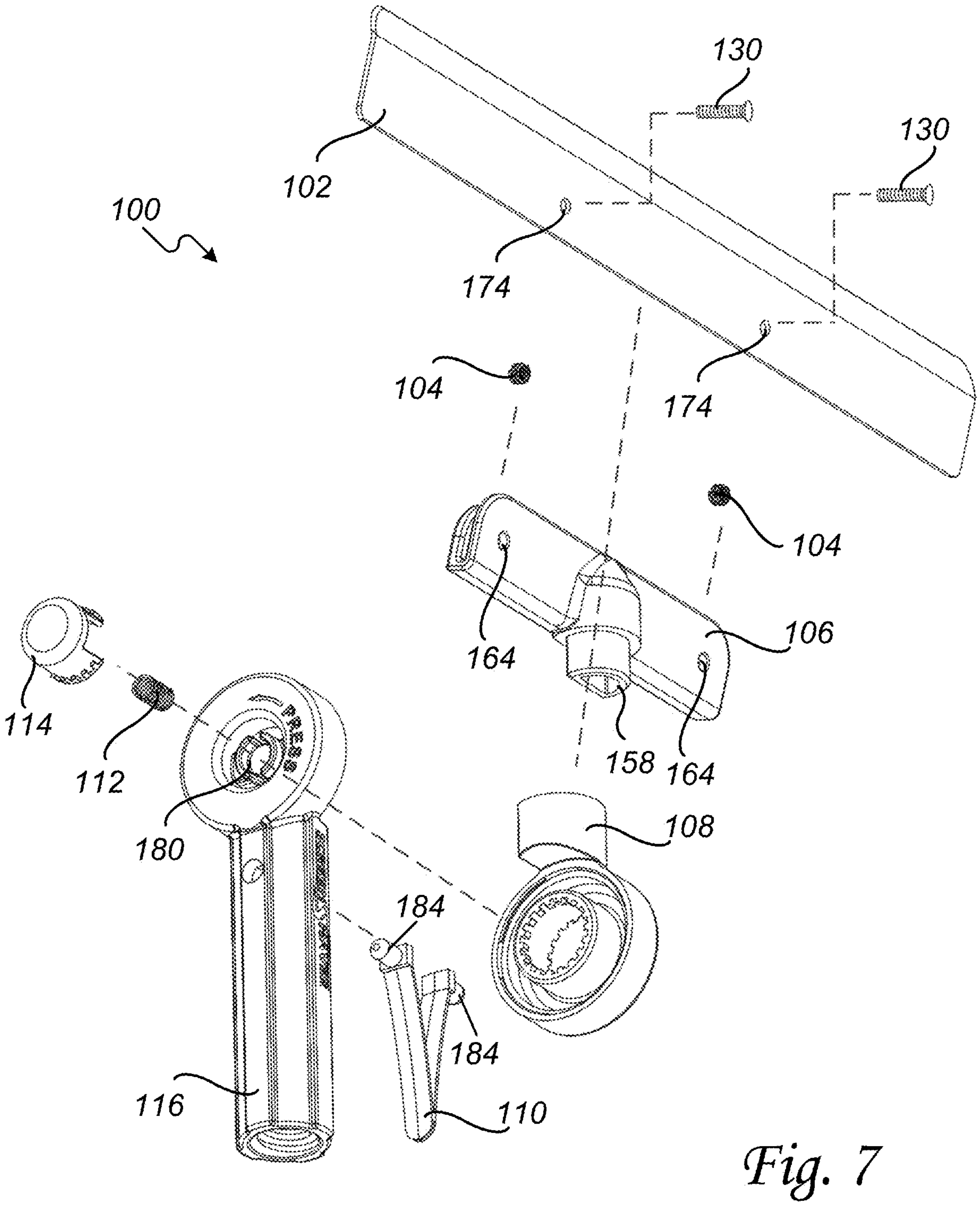
FIG. 7 illustrates one example of a disassembled view of a patio screen shaver.

Referring to FIG. 7, there is illustrated one example of a disassembled view of a patio screen shaver 100. In an exemplary embodiment, a patio screen shaver 100 cuts pine needles 204 that are impaled in a patio screen 202. The patio screen shaver 100 comprises a blade 102. Blade 102 comprises a cutting edge 170. Blade 102 has one or more blade holes 174 therethrough.

With reference to at least FIGS. 7 and 11, a blade mount 106 comprises a blade mount adapter 158, a top lip 160, and a bottom lip 162 parallel to the top lip 160 forming a blade gap 178 therebetween. Blade mount 106 has one or more mounting holes 164. The blade 102 slides into the blade gap 178. The blade holes 164 and the mounting holes 174 align and one or more fasteners 130 pass through the blade hole 174 and the mounting hole 164 securing the blade 102 within the blade mount gap 178 between the top lip 160 and the bottom lip 162. The top lip 160 extends along the top surface of the blade 102 and the bottom lip 162 extends along the bottom surface of the blade 102. The top lip 160 is longer 320 than the bottom lip 162 extending beyond the bottom lip creating a pressure fulcrum 330 on the top side of the blade, forcing the cutting edge 170 downward along the surface of the patio screen 202 during use.

With reference to at least FIGS. 7 and 9, a handle adapter 108 has an exterior surface and an interior surface. The handle adapter 108 comprises an adapter receiver 134 that interconnects with the blade mount adapter 158, and a geared ring 140 integrally formed on the interior surface.

With reference to at least FIGS. 7 and 8, handle 116 interconnects with the handle adapter 108 in a movable 304 manner. Handle 116 has a handle exterior surface and a handle interior surface. Handle 116 comprises a spring recess 180 along the handle 116 exterior surface for receiving spring 112 and one or more button cutouts 126 proximate to the spring recess 180.

With reference to at least FIGS. 7 and 10, button 114 comprises a closed end 154 and a geared end 156. Button 114 has one or more side-notched cutouts 148 between the closed end 154 and the geared end 156, allowing button 114 to be fitted into the button cutouts 126 capturing spring 112 within the spring recess 180 and engaging the geared end 156 with the geared ring 140 securing handle 116 and the handle adapter 108 together in a movable 304 manner.

With reference to at least FIG. 7, one or more threaded inserts 104 can be fitted into the mounting holes 164 associated with the bottom lip 162 of the blade mount 106. In operation, fastener 130 can be a screw that passes through the mounting holes 130 associated with the top lip 106 and the blade holes 174, and threads into the threaded inserts 104 pinching the top lip 160 and the bottom lip 162 against blade 102 surface, tightly securing the blade 102 within the blade gap 178 in a removable manner.

Referring to FIG. 8, there are illustrated interior and exterior perspective views of handle 116. In reference 'A' there is illustrated one example of a right side exterior perspective view of handle 116, and in reference 'B' there is illustrated one example of a left side interior view of handle 116. In an exemplary embodiment, handle 116 comprises more than one raise gripping rib 128 that traverses the length of the handle 116. The raised gripping rib 128 provides a tactile feel and improves the grip-ability by the user 402 of the handle 116 during the use of the patio screen shaver 100.

In an exemplary embodiment and with reference to at least FIGS. 8 and 9, a handle rail 122 can be integrally formed along a portion of the handle 116 interior surface. And, a handle adapter rail 138 can be integrally formed along a portion of the interior surface of the handle adapter 108. The handle rail 122 and the handle adapter rail 138 are opposed and press-fit interlocking together in a movable 304 manner.

Referring to FIG. 9, there are illustrated interior, exterior, and perspective views of the handle adapter 108. Reference 'A' illustrates an interior view of handle adapter 108, reference 'B' illustrates a perspective view of the handle adapter 108, and reference 'C' illustrates an exterior view of the handle adapter 108.

Referring to FIG. 10, there are illustrated interior, exterior, and perspective views of button 114. Reference 'A' illustrates an interior view of button 114, reference 'B' illustrates a rear perspective view of button 114, and reference 'C' illustrates a front view of button 114.

In an exemplary embodiment, button 114 comprises at least one alignment tab 152. The spring recess 180 has at least one alignment slot 176. The alignment tab 152 slides into the alignment slot 176, preventing button 114 from rotating with respect to the handle 116.

Referring to FIG. 11, there are illustrated back, front, side, and perspective views of a blade mount 106. Reference 'A' illustrates a back view of the blade mount 106, reference 'B' illustrates a rear perspective view of the blade mount 106, reference 'C' illustrates a side view of the blade mount 106, and reference 'D' illustrates a front view of the blade mount 106.

In an exemplary embodiment, the blade mount adapter 158 and the adapter receiver 134 are asymmetrically shaped so that they interconnect but the blade mount adapter 158 is abated from rotating with respect to the adapter receiver 134, holding the blade 102 in a fixed orientation with respect to the adapter receiver 134. In this regard, as one example, as illustrated in at least FIGS. 9 and 11, the blade mount adapter 158 and the adapter receiver 134 are asymmetrically 'D' shaped allowing them to interlock but preventing the blade mount adapter 158 from rotating with respect to the adapter receiver 134, holding the blade 102 in a fixed orientation with respect to the adapter receiver 134.

Figure 12:
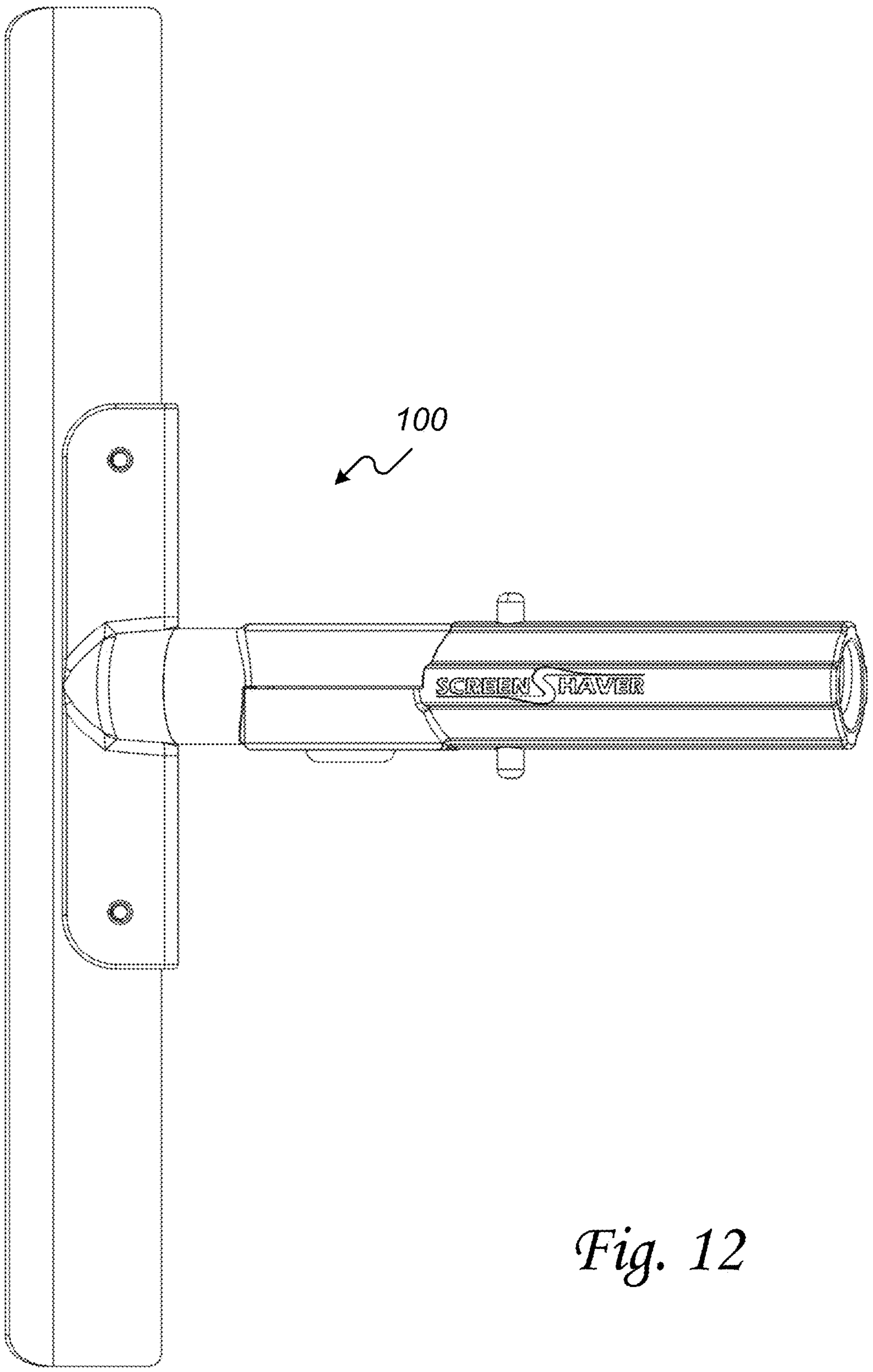
FIG. 12 illustrates a top view of a patio screen shaver.
Figure 13:
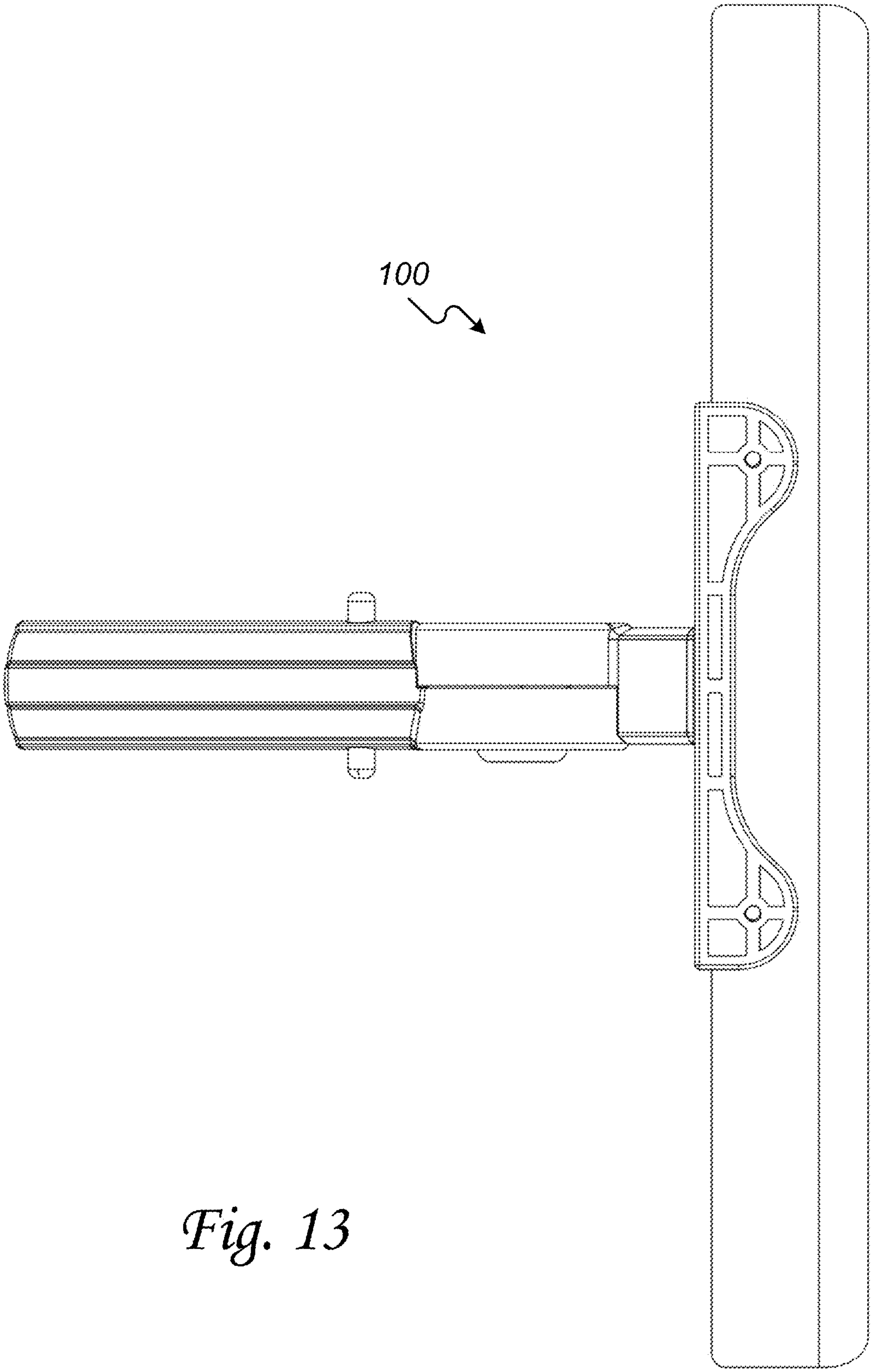
FIG. 13 illustrates a bottom view of a patio screen shaver.
Figure 14:
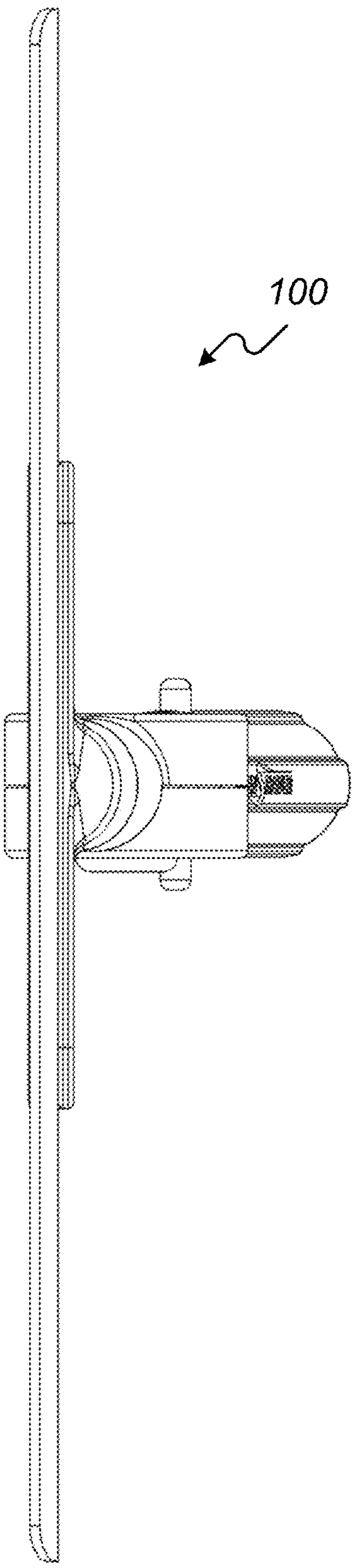
FIG. 14 illustrates a front view of a patio screen shaver.
Figure 15:
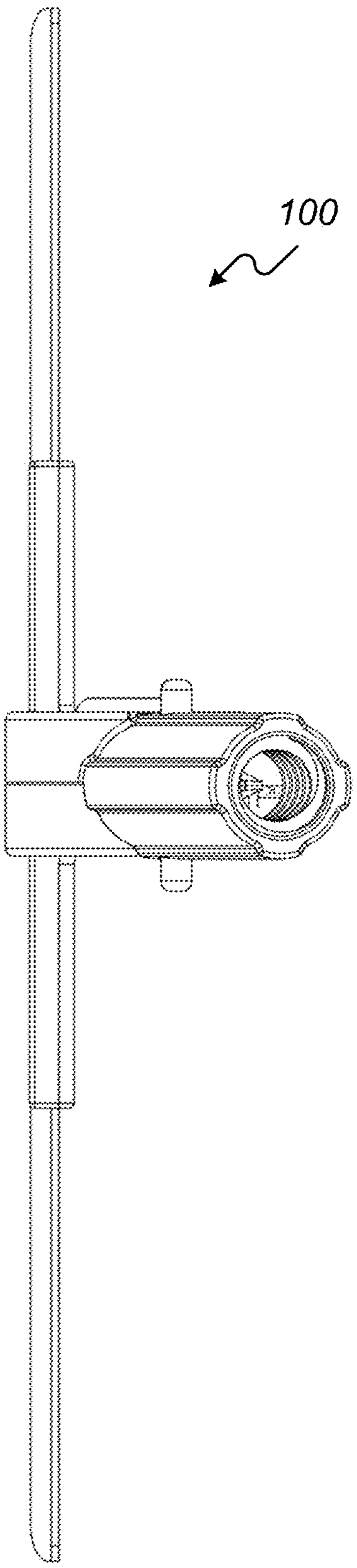
FIG. 15 illustrates a back view of a patio screen shaver.
Figure 16:
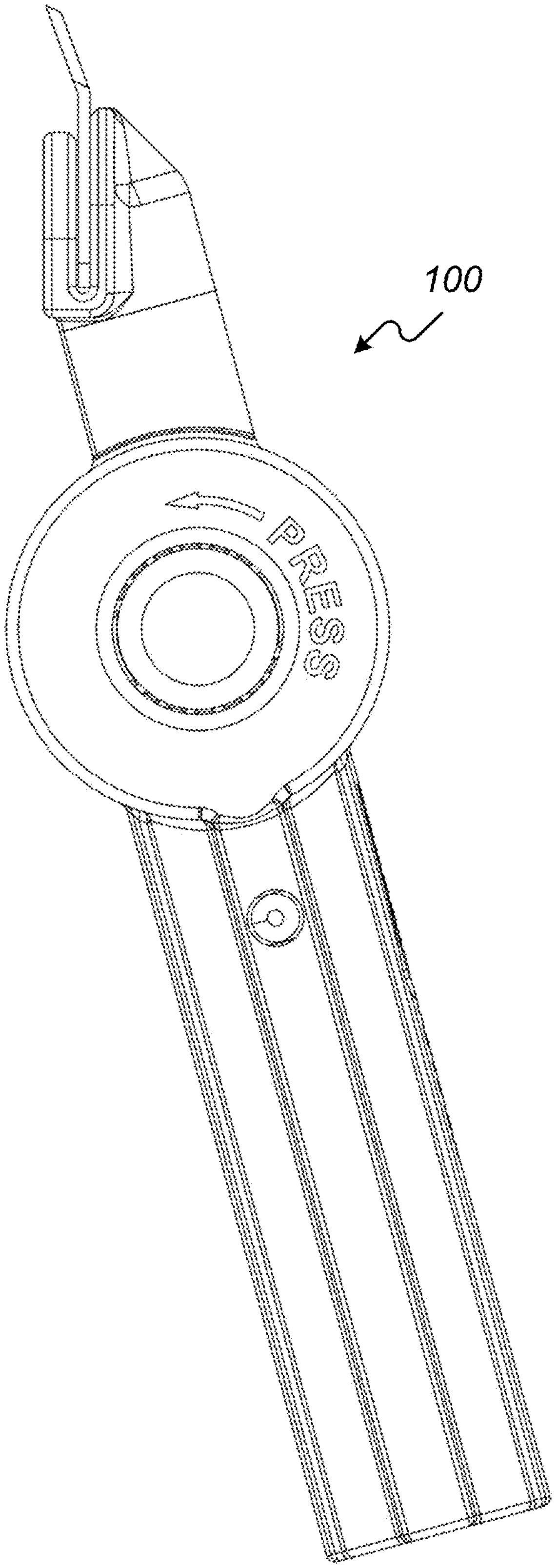
FIG. 16 illustrates a right side view of a patio screen shaver.
Figure 17:
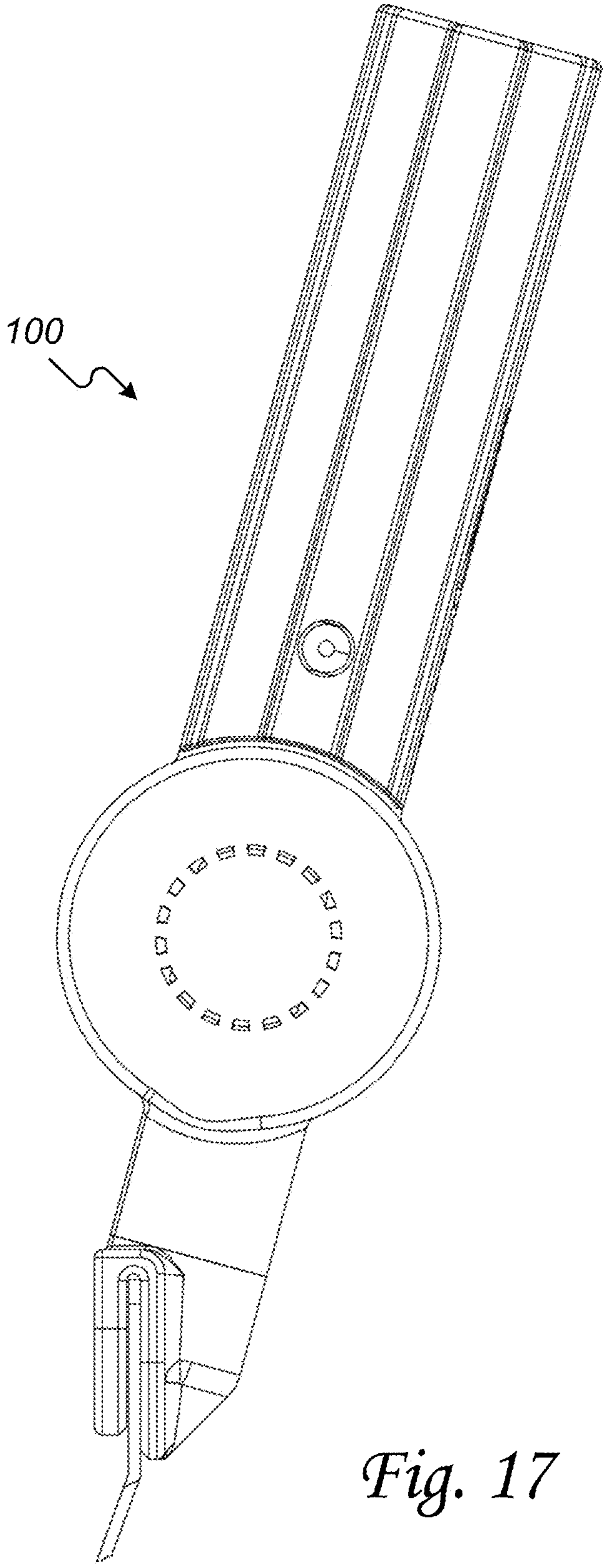
FIG. 17 illustrates a left side view of a patio screen shaver.

Referring to FIG. 12, there is illustrated a top view of a patio screen shaver 100. Referring to FIG. 13, there is illustrated a bottom view of a patio screen shaver 100. Referring to FIG. 14, there is illustrated a front view of a patio screen shaver 100. Referring to FIG. 15, there is illustrated a back view of a patio screen shaver 100. Referring to FIG. 16, there is illustrated a right side view of a patio screen shaver 100. Referring to FIG. 17, there is illustrated a left side view of a patio screen shaver 100.

Figure 18:
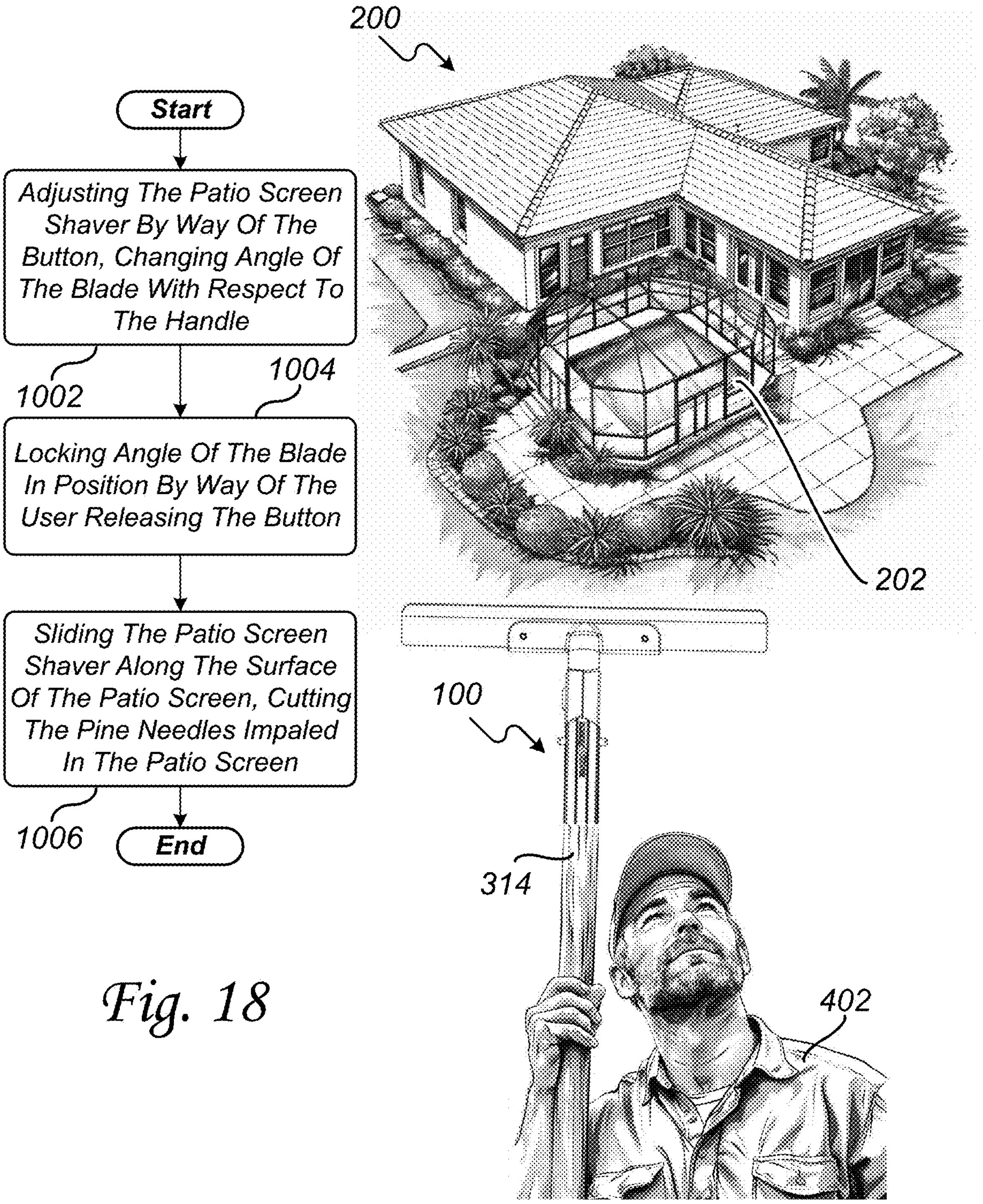
FIG. 18 illustrates one example of using a patio screen shaver.

Referring to FIG. 18, there is illustrated one example of using a patio screen shaver 100. In an exemplary embodiment, the method begins in step 1002 by adjusting the angle of the blade 102 with respect to the handle 116 by way of user 402 pressing button 114 which compresses spring 112 and disengages the geared end 156 from the geared ring 140 allowing the handle adapter 108 to rotate 304, changing the angle of blade 102 with respect to handle 116. The method then moves to step 1004.

The method continues in step 1004 by locking the angle of blade 102 in position with respect to handle 116 by way of user 402 releasing button 114 which decompresses spring 112 and engages the geared end 156 with the geared ring 140 securing the handle adapter 108 in place, setting the angle of blade 102, and abating rotational 304 motion of the handle adapter 108 with respect to handle 116. The method then moves to step 1006.

The method continues in step 1006 by sliding the patio screen shaver 100 along the surface of the patio screen 202, cutting the pine needles 204 impaled in the patio screen 202. The method is then exited.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A patio screen shaver cuts pine needles that are impaled in a patio screen, the patio screen shaver comprising:

a blade comprises a cutting edge, the blade having one or more of a blade hole therethrough;

a blade mount comprises a blade mount adapter, a top lip, and a bottom lip parallel to the top lip forming a blade gap therebetween, the blade mount having one or more of a mounting hole, the blade slides into the blade gap, the blade hole and the mounting hole align and one or more of a fastener passes through the blade hole and the mounting hole securing the blade within the blade mount gap between the top lip and the bottom lip, the top lip extends along top surface of the blade and the bottom lip extends along bottom surface of the blade, the top lip extends beyond the bottom lip creating a pressure fulcrum on top side of the blade, forcing the cutting edge downward along surface of the patio screen during use;

a handle adapter having an exterior surface and an interior surface, the handle adapter comprises an adapter receiver that interconnects with the blade mount adapter, and a geared ring that is integrally formed on the interior surface;

a handle interconnects with the handle adapter in a movable manner, the handle having a handle exterior surface and a handle interior surface, the handle comprises a spring recess along the handle exterior surface for receiving a spring and one or more of a button cutout proximate to the spring recess; and a button comprises a closed end and a geared end, the button having one or more of a side-notched cutout between the closed end and the geared end, allowing the button to be fitted into the button cutout capturing the spring within the spring recess and engaging the geared end with the geared ring securing the handle and the handle adapter together in a movable manner.

2. The patio screen shaver in accordance with claim 1, the blade mount having a left side and a right side, the blade extending beyond the left side and the right side of the blade mount.

3. The patio screen shaver in accordance with claim 1, corners of the cutting edge are smooth and rounded, wherein the edges of the blade are abated from catching and cutting the patio screen.

4. The patio screen shaver in accordance with claim 1, the blade further comprising:

an alignment bend traverses length of the blade, the alignment bend is positioned between the cutting edge and the pressure fulcrum, wherein angle of the alignment bend positions tip of the cutting edge proximate to bottom of the bottom lip so that in use, as the bottom lip travels along the patio screen surface, the cutting edge is a predetermined safe cut distance above the patio screen surface, wherein damage to the patio screen by the cutting edge is abated.

5. The patio screen shaver in accordance with claim 1, further comprising:

one or more of a threaded insert is fitted into the mounting holes associated with the bottom lip of the blade mount, wherein the fastener is a screw that passes through the mounting holes associated with the top lip and the blade holes, and threads into the threaded insert pinching the top lip and the bottom lip against the blade surface, tightly securing the blade within the blade gap in a removable manner.

6. The patio screen shaver in accordance with claim 1, the blade mount adapter and the adapter receiver are asymmetrically shaped so that they interconnect but the blade mount adapter is abated from rotating with respect to the adapter receiver, holding the blade in a fixed orientation with respect to the adapter receiver.

7. The patio screen shaver in accordance with claim 1, the blade mount adapter further comprises:

a gliding rib is integrally formed on bottom side of the bottom lip, the gliding rib traverses the perimeter of the bottom lip, the gliding rib is smooth and rounded along front corners and edges, to abate damage when sliding along the patio screen during use of the patio screen shaver by the user.

8. The patio screen shaver in accordance with claim 1, the handle adapter having more than one of a position indicator hole, wherein by way of the position indicator hole indication of the angle of the blade with respect to the handle is viewable to and settable by the user.

9. The patio screen shaver in accordance with claim 1, the button comprises at least one of an alignment tab, the spring recess having at least one of an alignment slot, the alignment tab slides into the alignment slot, preventing the button from rotating with respect to the handle.

10. The patio screen shaver in accordance with claim 1, the handle comprises more than one of a raise gripping rib that traverses the length of the handle.

11. The patio screen shaver in accordance with claim 1, the handle comprises a threaded pole hole for receiving a pole having a threaded end.

12. The patio screen shaver in accordance with claim 1, further comprising:

a wishbone connector having at least one of a peg integrally formed on at least one end of the wishbone connector, the handle having at least one of a peg hole, the wishbone connector fits inside the handle and the peg protrudes through the peg hole, and is accessible to the user.

13. The patio screen shaver in accordance with claim 12, further comprising:

a pole having a hollow end and at least one pole peg hole, the handle slides into the hollow end and the peg protrudes through the pole peg hole securing the patio screen shaver to the pole.

14. The patio screen shaver in accordance with claim 1, further comprising:

a handle rail is integrally formed along a portion of the handle interior surface; and a handle adapter rail is integrally formed along a portion of the interior surface, the handle rail and the handle adapter rail are opposed and press-fit interlocking together in a movable manner.

15. A method of using the patio screen shaver of claim 1, the method comprising the steps of:

adjusting an angle of the blade with respect to the handle by way of a user pressing the button which compresses the spring and disengages the geared end from the geared ring allowing the handle adapter to rotate, changing angle of the blade with respect to the handle;

locking the angle of the blade in position with respect to the handle by way of the user releasing the button which decompresses the spring and engages the geared end with the geared ring securing the handle adapter in place, setting the angle of the blade, and abating rotational motion of the handle adapter with respect to the handle; and sliding the patio screen shaver along surface of the patio screen, cutting the pine needles impaled in the patio screen.

16. A patio screen shaver cuts pine needles that are impaled in a patio screen, the patio screen shaver comprising:

a blade comprises a cutting edge, the blade having one or more of a blade hole therethrough;

a blade mount comprises a blade mount adapter, a top lip, and a bottom lip parallel to the top lip forming a blade gap therebetween, the blade mount having one or more of a mounting hole therethrough, the blade slides into the blade gap, the blade hole and the mounting hole align and one or more of a fastener passes through the blade hole and the mounting hole securing the blade within the blade mount gap between the top lip and the bottom lip, the top lip extends along top surface of the blade and the bottom lip extends along bottom surface of the blade, the top lip extends beyond the bottom lip creating a pressure fulcrum on top side of the blade, forcing the cutting edge downward along surface of the patio screen during use;

a handle adapter having an exterior surface and an interior surface, the handle adapter comprises an adapter receiver that interconnects with the blade mount adapter, and a geared ring that is integrally formed on the interior surface;

a handle interconnects with the handle adapter in a movable manner, the handle having a handle exterior surface and a handle interior surface, the handle comprises a spring recess along the handle exterior surface for receiving a spring and one or more of a button cutout proximate to the spring recess;

a button comprises a closed end and a geared end, the button having one or more of a side-notched cutout between the closed end and the geared end, allowing the button to be fitted into the button cutout capturing the spring within the spring recess and engaging the geared end with the geared ring securing the handle and the handle adapter together in a movable manner, the patio screen shaver transitions between:

adjusting an angle of the blade with respect to the handle by way of a user pressing the button which compresses the spring and disengages the geared end from the geared ring allowing the handle adapter to rotate and change the angle of the blade with respect to the handle; and setting angle of the blade by way of the user releasing the button which decompresses the spring and engages the geared end with the geared ring securing the handle adapter in place, and abating rotational motion of the handle adapter with respect to the handle when the patio screen shaver is used by the user to cut the pine needles impaled in the patio screen.

17. The patio screen shaver in accordance with claim 16, corners of the cutting edge are smooth and rounded, wherein the edges of the blade are abated from catching and cutting the patio screen.

18. The patio screen shaver in accordance with claim 16, the blade further comprising:

an alignment bend traverses length of the blade, the alignment bend is positioned between the cutting edge and the pressure fulcrum, wherein angle of the alignment bend positions tip of the cutting edge proximate to bottom of the bottom lip so that in use, as the bottom lip travels along the patio screen surface, the cutting edge is a predetermined safe cut distance above the patio screen surface, wherein damage to the patio screen by the cutting edge is abated.

19. The patio screen shaver in accordance with claim 16, the blade mount adapter further comprises:

a gliding rib is integrally formed on bottom side of the bottom lip, the gliding rib traverses the perimeter of the bottom lip, the gliding rib is smooth and rounded along front corners and edges, to abate damage when sliding along the patio screen during use of the patio screen shaver by the user.

20. The patio screen shaver in accordance with claim 16, the handle adapter having more than one of a position indicator hole, wherein by way of the position indicator hole indication of the angle of the blade with respect to the handle is viewable to and settable by the user.

* * * * *